US009432588B2

(12) United States Patent
Svensson et al.

(10) Patent No.: US 9,432,588 B2
(45) Date of Patent: Aug. 30, 2016

(54) METHOD AND CONTROL UNIT FOR CONTROLLING EXPOSURE OF A CAMERA

(71) Applicant: Axis AB, Lund (SE)

(72) Inventors: Fredrik Svensson, Lund (SE); Johan Tuvesson, Lund (SE); Linda Haals, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 14/628,885

(22) Filed: Feb. 23, 2015

(65) Prior Publication Data
US 2015/0244918 A1  Aug. 27, 2015

(30) Foreign Application Priority Data

Feb. 26, 2014  (EP) .................................... 14156752

(51) Int. Cl.
*H04N 5/235* (2006.01)
*H04N 9/77* (2006.01)
*H04N 5/243* (2006.01)

(52) U.S. Cl.
CPC .......... *H04N 5/2353* (2013.01); *H04N 5/2351* (2013.01); *H04N 5/2352* (2013.01); *H04N 5/243* (2013.01); *H04N 9/77* (2013.01)

(58) Field of Classification Search
CPC .. H04N 5/2353; H04N 5/2351; H04N 5/235; H04N 5/243; H04N 5/2352; H04N 9/77
See application file for complete search history.

(56) References Cited

U.S. PATENT DOCUMENTS

| 5,194,960 | A | 3/1993 | Ota |
| 7,176,976 | B2* | 2/2007 | Easwar .................... G03B 3/00 348/229.1 |
| 7,474,847 | B2 | 1/2009 | Nikkanen et al. |
| 7,978,258 | B2* | 7/2011 | Christiansen ........ H04N 5/2353 348/364 |
| 9,253,412 | B2* | 2/2016 | Lee ........................ H04N 5/232 |
| 2005/0264684 | A1 | 12/2005 | Kamon et al. |
| 2007/0009253 | A1 | 1/2007 | Nikkanen et al. |
| 2008/0069400 | A1 | 3/2008 | Zhu et al. |
| 2009/0033764 | A1* | 2/2009 | Hung ..................... G03B 7/093 348/229.1 |

(Continued)

FOREIGN PATENT DOCUMENTS

| CN | 1813218 A | 8/2006 |
| CN | 101267504 A | 9/2008 |

(Continued)

OTHER PUBLICATIONS

Rear-Lamp Vehicle Detection and Tracking in Low-Exposure Color Video for Night Conditions; O'Malley et al.; IEEE Transactions on Intelligent Transportation Systems, vol. 11, No. 2 Jun. 2010.

(Continued)

*Primary Examiner* — Luong T Nguyen
(74) *Attorney, Agent, or Firm* — Volpe and Koenig, P.C.

(57) ABSTRACT

A method for controlling exposure of a camera is disclosed. The method comprises calculating a darkness level and a saturation level with respect to a first image in a video sequence. If the saturation level exceeds a first limit, a target value for a mean intensity value of pixels in images captured by the camera is decreased by an amount which is an increasing function of the darkness level. The decreased target value is used to control the exposure of the camera for images subsequent to the first image in the video sequence, such that the mean intensity value of pixels in the subsequent images approaches the decreased target value.

15 Claims, 6 Drawing Sheets

(56) References Cited

U.S. PATENT DOCUMENTS

| 2010/0027009 A1 | 2/2010 | Bhotika et al. |
| 2010/0091176 A1 | 4/2010 | Cha et al. |
| 2011/0164146 A1* | 7/2011 | Chiang ............... H04N 5/2352 348/229.1 |
| 2013/0038785 A1 | 2/2013 | Song |
| 2014/0016022 A1 | 1/2014 | Yoshioka et al. |

FOREIGN PATENT DOCUMENTS

| JP | 2003087646 A2 | 3/2003 |
| JP | 2005-333248 A | 12/2005 |
| JP | 2009097921 A2 | 5/2009 |
| JP | 2009118520 A2 | 5/2009 |
| JP | 2009-157086 A | 7/2009 |
| JP | 4304610 B2 | 7/2009 |
| JP | 2013-192003 | 9/2013 |
| WO | 2005001563 A1 | 1/2005 |

OTHER PUBLICATIONS

A Vision-Based Traffic Light Detection System at Intersections; Chung et al.; Department of Information and Computer Education; Department of Computer Science and Information Engineering; National Taiwan Normal University, Taipei, TW 106, Republic of China; 2002, 47(1), pp. 67-86.

* cited by examiner

METHOD AND CONTROL UNIT FOR CONTROLLING EXPOSURE OF A CAMERA

FIELD OF INVENTION

The present invention relates to the field of exposure control. In particular it relates to a method, a control unit, and a system for exposure control of a camera.

BACKGROUND

Cameras are commonly used as a surveillance tool or as a tool for assisting persons in different situations. For example, cameras may be used for traffic surveillance or traffic assistance purposes. A camera may for instance be mounted on a car or on a train in order to assist the driver or provide input to an auto-pilot or safety system.

During night time a problem with saturation of pixels in the images captured by the camera may arise if a strong light source enters the scene. Saturation is due to the fact that the limited dynamics of the pixels in the camera sensor makes it impossible to capture the entire range of light intensities. As a result it may for instance be difficult to see the colour of signals, such as traffic lights and railway signals, during night time. It may also be difficult to distinguish the numbers on a license plate since light reflected by a license plate may cause saturation in the image.

For the surveillance purposes exemplified above it is thus important not to saturate any parts of the image during night time. At the same time it does not matter if parts of the image are saturated during day time when the sun often causes saturation in the images and therefore the brightest part of the scene usually is the sky which is not that important from a surveillance point of view.

The patent with publication number U.S. Pat. No. 7,474,847 B2 discloses exposure control of a camera based on intensity histograms from image frames. In more detail, characteristic values, such as a mean value, a lower limit and an upper limit, are extracted from the histogram. Exposure parameters of the camera are then adjusted until the characteristic values of the histogram reaches some predefined target levels. The target levels may be varied in accordance with the ambient light level, such that the target levels are decreased when it is dark. As a result, the histogram of images captured when it is dark will be shifted towards the darker end of the intensity range, thereby likely decreasing the number of saturated pixels in the images. This shift makes the images appear underexposed. However, a drawback with this method is that the images will always be underexposed when it is dark, regardless of whether there is saturation in the images or not. For example, the images will be underexposed even if there are no traffic lights in the scene at night time. There is thus room for improvements.

SUMMARY

In view of the above, it is thus an object of the present invention to provide an improved method for exposure control of a camera that reduces saturation in images during dark illumination conditions, while at the same time correctly exposed images are produced during light illumination conditions or dark illumination conditions when no saturation is present.

According to a first aspect of the invention, the above object is achieved by a method for controlling exposure of a camera, comprising the steps of:

determining an exposure time and a gain used by the camera when capturing a first image in a video sequence, calculating a darkness level with respect to the first image as a product of at least the exposure time and the gain, calculating a saturation level with respect to the first image as a ratio between a number of saturated pixels and a number of completely dark pixels in the first image, if the saturation level exceeds a first limit, decreasing a target value for a mean intensity value of pixels in images captured by the camera by an amount which is an increasing function of the darkness level, and controlling exposure of the camera for images subsequent to the first image in the video sequence, such that the mean intensity value of pixels in the subsequent images approaches the decreased target value.

According to the above method, the target value for the mean intensity value of pixels in images captured by the camera is decreased in order to reduce the problem with saturation. In more detail, decreasing the target value for the mean intensity value used in the control of the camera causes the histogram of intensity values of subsequent images to be shifted downwards on the intensity scale. As a consequence, the number of saturated pixels decreases.

The target value for mean intensity value is decreased as an increasing function of the darkness level. For example, the increasing function of the darkness value may give the amount of decrease of the target value as a percentage with respect to a current target value. That is, the darker it is the more the target value is decreased. This implies that the reduction of saturated pixels is greater during dark illumination conditions, when it from a surveillance point of view as exemplified above is important to decrease the number of saturated pixels, in comparison to less dark or even light illumination conditions, when it is not so important to decrease the number of saturated pixels. With this arrangement, the problems with saturation may be decreased when it is dark at the same time as correctly exposed images may be produced during light illumination conditions.

Moreover, it is important to note that the target value is only decreased if there is a problem with saturation in the current image, i.e. if the saturation level exceeds the first limit, regardless of the current darkness level. In this way, correctly exposed images are produced during dark illumination conditions when no saturation is present.

Consider for example a camera which is mounted to look ahead of a car. At night (when it is dark) the situation is as follows: As long as there are no bright lights, such as a traffic light or a reflecting license plate in the scene, the images of the camera will be correctly exposed (i.e. the target value is not decreased). This means that the target value for the mean intensity is set such that a high visibility is achieved in most scenes, i.e. such that a balance is achieved between light and dark portions in the images. When a bright light enters the scene, such as when the car approaches a traffic light, problems with saturation in the images may arise. However, in this situation the target value will be decreased, thereby reducing the saturation problem. As a result, it will be possible to see the colour of the traffic light or read text on the license plate in the images. During day (when it is light) the situation is as follows: Regardless of whether there are bright lights in the image or not, the image will be correctly exposed (i.e. the target value is not decreased). For an illumination condition which is between "dark" and "light", such as at dusk, a mixture between the above two situations occurs. More precisely, if there is saturation in the current image the target value is adjusted by an amount which depends on the darkness level.

A pixel in the first image is deemed to be a saturated pixel if the intensity value of the pixel exceeds a predefined value at an upper end of a range of possible intensity values.

Similarly, a pixel in the first image is deemed to be a completely dark pixel if the intensity value of the pixel is below a predefined value at a lower end of the range of possible intensity values.

The terms "saturated pixel" and "completely dark pixel" may further be explained with reference to the histogram of intensity values of the first image. In the histogram, the intensity values are divided into a number of bins which correspond to a range of possible intensity values. For example there may be 256 bins in the histogram corresponding to a range of possible intensity values between 0 and 255. In this context a saturated pixel may be defined as a pixel having an intensity value which falls into a bin corresponding to one of the highest possible intensity values. In some cases only the bin corresponding to the highest intensity value (intensity value 255 in the example) is used to define a saturated pixel. In other cases a few bins, such as the bins corresponding to the two or three highest intensity values are used. Similarly, a completely dark pixel may be defined as a pixel having an intensity value which falls into a bin corresponding to one of the lowest possible intensity values.

Consider now a situation where the target level has been decreased in order to reduce saturation at night, e.g. since the car on which the camera is mounted approached a traffic light. As the car passes the traffic light, the bright light disappears from the scene and for this reason there is no longer any potential saturation problem. However, since the target level was decreased, the images captured by the camera will still appear as underexposed. In order to adapt to this situation the method may further comprise the step of:

if the saturation level is below a second limit which is lower than or equal to the first limit, increasing the target value for the mean intensity value of pixels in images captured by the camera, and controlling exposure of the camera for images subsequent to the first image in the video sequence, such that the mean intensity value of pixels in the subsequent images approaches the increased target value.

In other words, if it is discovered that there is no longer a problem with saturation (the saturation level is below the second limit) the target value may be increased again. In this way the method may first decrease the target value when a bright light enters the scene and then increase the target value again when the bright light leaves the scene. The method may thus adapt to the current conditions with respect to illumination and saturation.

For example, the target value of the mean intensity value may be increased by an amount which decreases with the darkness level. That is, the darker it is the smaller is the amount by which the target value is increased. This is advantageous in that the increase of the target level may be made in big steps when it is light (when the risk of running into new saturation problems does not matter) and in small steps when it is dark (and the risk of running into new saturation problems is important).

The decrease with darkness level does not need to be a strict decrease. In other words, the case where the increase of the target level is made in constant steps regardless of the darkness level is also included.

As discussed above, the target value of the mean intensity value is decreased by an amount which is an increasing function of the darkness level. The increasing function of the darkness level may take the value zero for darkness levels below a first threshold, such that the target value is not decreased for darkness levels below the first threshold.

In other words, there may be a first threshold which distinguishes a light illumination condition, for which no decrease of the target value is performed, from a darker illumination condition for which the target value is decreased in case of saturation. Accordingly, the target level is not decreased if it is found out that it currently is a light illumination condition, even if saturation is present. This is advantageous since the presence of saturation is not important from a surveillance point of view, at least not for the applications mentioned herein, when it is a light illumination condition.

There may further be a second threshold with respect to the darkness level which defines dark illumination conditions. More precisely, the increasing function of the darkness level may take a first value for darkness levels below a first threshold and a second value for darkness levels above a second threshold larger than the first threshold, and wherein for darkness levels between the first threshold and the second threshold the function increases smoothly from the first value to the second value.

In other words, for darkness levels below the first threshold (i.e. when it is a light illumination condition) the target level is decreased by a first value which corresponds to a minimum step size. For darkness levels above the second threshold (i.e. when it is a dark illumination condition) the target level is decreased by a second value which corresponds to a maximum step size. For darkness levels between the first and second threshold (i.e. when it is between light and dark) the decrease of the target value increases smoothly from the minimum step size to the maximum step size with increasing darkness level.

This is advantageous in that a smooth transition between dark illumination conditions and light illumination conditions is achieved.

Generally, the shape of the function may take any increasing form between the first threshold and the second threshold. For example, the function may increase linearly from the first value to the second value. This has been found to give a good transition between dark illumination conditions and light illumination conditions at the same time as it provides a simple model which is easy to implement.

The method may further comprise receiving user input regarding the value of the first threshold. This is advantageous in that the user can set the threshold which defines what is meant by a light illumination condition.

The method may further comprise receiving user input regarding the value of first limit and/or the second limit, if applicable, to which the saturation level is compared. This is advantageous in that the user can set the limits which define whether there is saturation present or not. The limits can be set depending on for instance the size of traffic lights or license plates.

The exposure of the camera for images subsequent to the first image in the video sequence may be controlled based on an error. In particular the method may further comprise generating a control signal for the camera based on an error calculated from the mean intensity value of pixels in the subsequent images and the decreased or, if applicable, the increased target value. The control signal may comprise a term which is proportional to the error (P-controller), and optionally a term which is proportional to the integral of the error (PI-controller) and optionally also a term which is proportional to the derivative of the error (PID-controller). Alternatively, any other standard control method may be used.

However, preferably another approach is taken, namely that the control signal is dependent on the error according to a function having a derivative which increases with the distance between the calculated error and a value that the error would take if the mean intensity value were equal to the decreased or, if applicable, the increased target value. In this way the control is more sensitive to changes in the error when the error is large, i.e. when the target value and the mean intensity value are far from being equal, and less sensitive to changes in the error when the target value and the mean intensity value are almost equal. Differently stated, the control will be faster when the mean intensity value is far from the target value, and slower when the mean intensity value is close to the target value. Notably, however, since the function is continuous there is no fixed limit between when a fast control is used and when a slow control is used.

This approach is advantageous in that a control is achieved which is fast when the target value and the mean intensity value are far from being equal, at the same time as it is robust when the target value and the mean intensity value are almost equal since the mean intensity value smoothly approaches the target value when the error becomes small. In particular, problems with P-, PI-, or PID-controllers, such as oscillations when the mean intensity value approaches the target value, may be avoided. Another advantage with this control method is that it does not give stationary errors and is easy to tune without giving rise to overshoots in the control.

In a preferred embodiment the error is calculated as a ratio between the decreased target value or, if applicable, the increased target value and the mean intensity value of pixels in the subsequent images. In another embodiment, the error is calculated as a difference between the mean intensity value of pixels in the subsequent images and the decreased target value, or if applicable the increased target value.

The function having a derivative which increases may for example be an inverse sigmoid function since this has been found to give a particularly fast and robust control.

According to a second aspect of the invention, the above object is achieved by a control unit for controlling exposure of a camera, the control unit being configured to:

determine an exposure time and a gain used by the camera when capturing a first image in a video sequence, calculate a darkness level with respect to the first image as a product of at least the exposure time and the gain, calculate a saturation level with respect to the first image as a ratio between a number of saturated pixels and a number of completely dark pixels in the first image, if the saturation level exceeds a first limit, decrease a target value of a mean intensity value of pixels in images captured by the camera by an amount which is an increasing function of the darkness level, and control exposure of the camera for images subsequent to the first image in the video sequence such that the mean intensity value of pixels in the subsequent images approaches the decreased target value.

According to a third aspect of the invention, the above object is achieved by surveillance system comprising at least one camera and a control unit according to the second aspect for controlling exposure of the at least one camera. The surveillance system may be a traffic surveillance system. The system may for example enable identification of coloured light signals or license plates in darkness.

According to a fourth aspect of the invention, the above object is achieved by computer-readable medium comprising computer code instructions which when executed by a device having processing capability are adapted to perform the method according to the first aspect.

The second, third, and fourth aspects may generally have the same features and advantages as the first aspect. It is further noted that the invention relates to all possible combinations of features unless explicitly stated otherwise.

Generally, all terms used in the claims are to be interpreted according to their ordinary meaning in the technical field, unless explicitly defined otherwise herein. All references to "a/an/the [control unit, camera, step etc.]" are to be interpreted openly as referring to at least one instance of said control unit, camera, step etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF THE PREFERRED EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person. The systems and devices disclosed herein will be described during operation.

Figure 1:
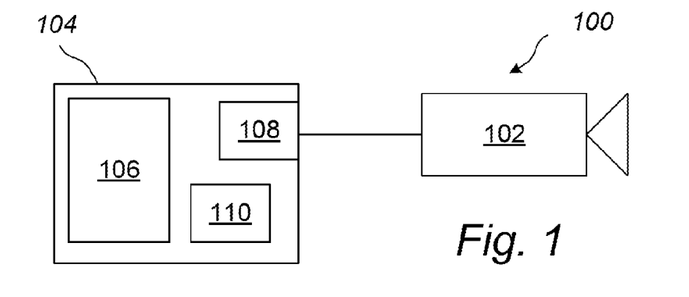
FIG. 1 schematically illustrates a surveillance system comprising a camera and a control unit according to embodiments.

FIG. 1 illustrates a surveillance system 100 comprising a camera 102 and a control unit 104. The camera 102 is configured to capture a video sequence of images, and may for instance be a digital surveillance camera. The control unit 104 may be included in the camera 102 or may be provided as a separate part which is operatively connected to the camera 102. Alternatively, a first part of the control unit 104 may be located in the camera 102 and a second part of the control unit 104 may be located outside of the camera 102, such that some of the method steps disclosed herein are carried out in the camera 102 and some are carried out outside of the camera 102. The system 100 may further comprise a plurality of cameras 100. A single control unit

104 may control a plurality of cameras 100. The surveillance system may for example be used in traffic monitoring applications. Hence, the surveillance system 100 may be a traffic surveillance system.

The control unit 104 is configured to carry out a method for controlling exposure of the camera 102 according to embodiments disclosed herein. For this purpose the control unit 104 may comprise a processing unit 106, such as a central processing unit, which is configured to execute computer code instructions which for instance may be stored on a memory 110. The memory 110 may thus form a (non-transitory) computer-readable medium for storing such computer code instructions. The processing unit 106 may alternatively be in the form of a hardware component which is specifically designed to carry out methods of embodiments disclosed herein, such as an application specific integrated circuit, a field-programmable gate array or the like.

The control unit 104 may further comprise a communication interface 108, such as a transmitter/receiver, via which it may receive data from the camera 102 and transmit data to the camera 102. The received data may for instance include images captured by the camera 102 and exposure settings used by the camera 102 when capturing the images. The transmitted data may for instance include a control signal for controlling exposure of the camera 102.

Figure 5A:
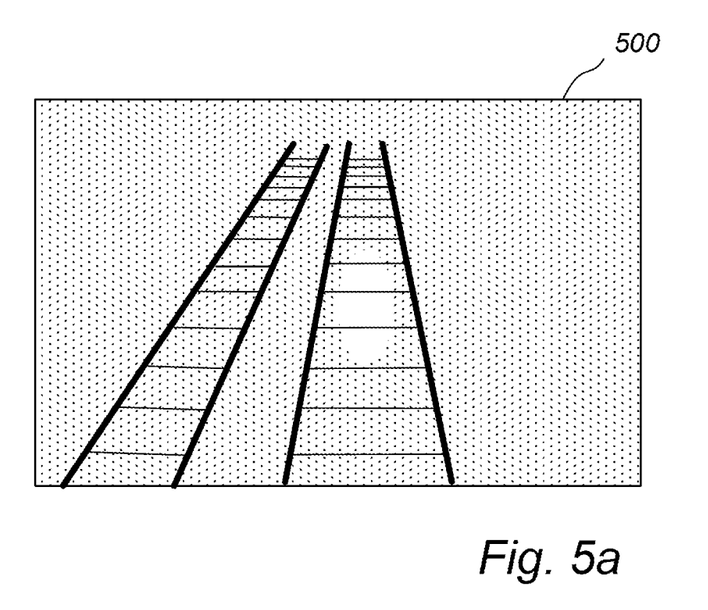
Figure 5B:
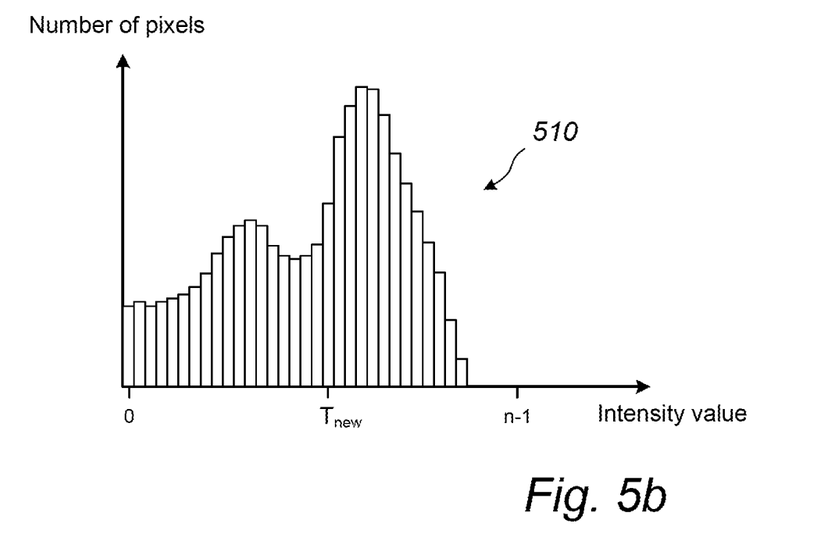
Figure 6:
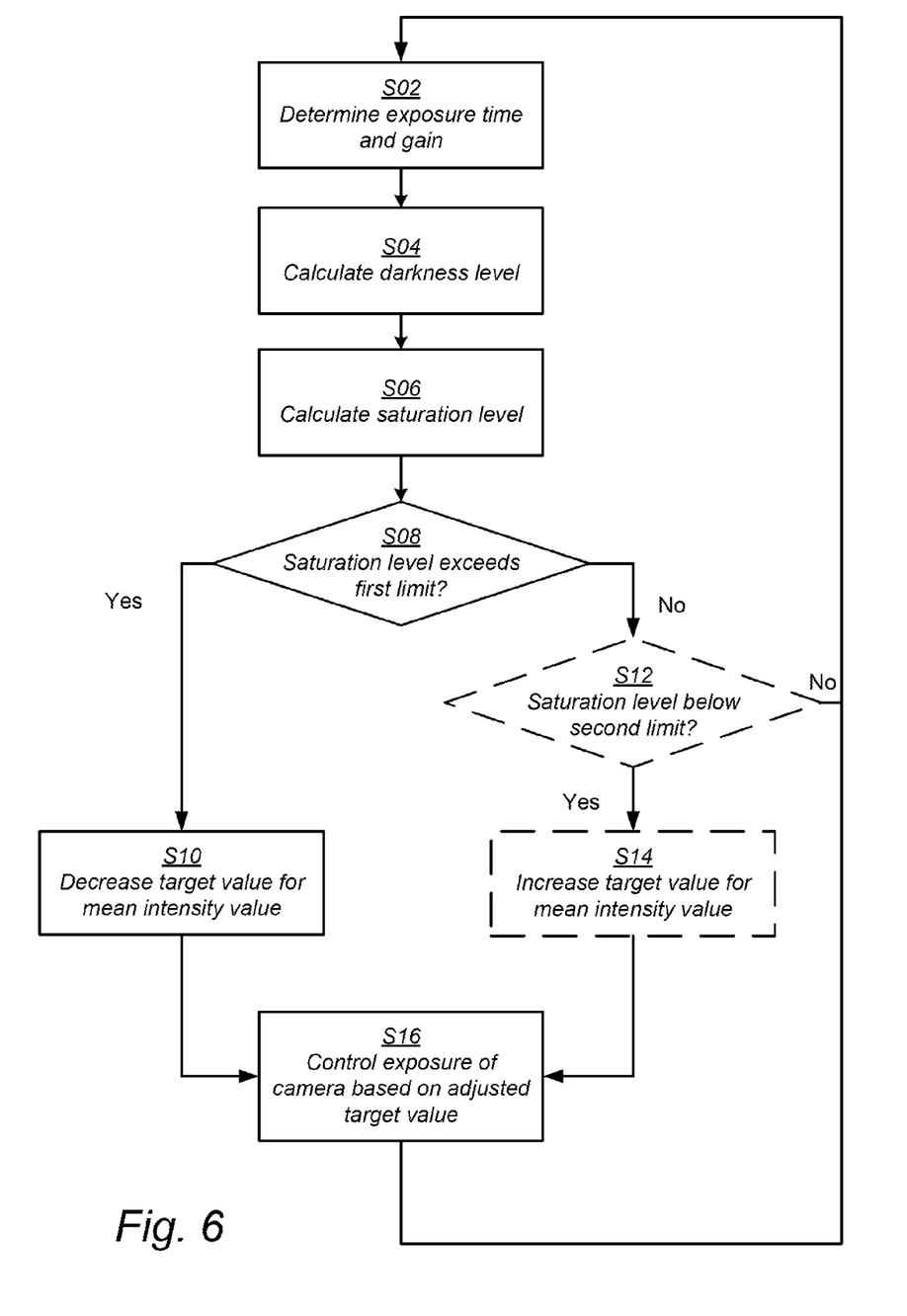
FIG. 6 is a flow chart of a method for controlling exposure of a camera according to embodiments.

The operation of the system 100 will now be disclosed with reference to FIGS. 1, 2a-b, 3a-b, 4a-b, 5a-b, 7, 8 and the flow chart of FIG. 6. In particular, a method carried out by the control unit 104 for controlling exposure of the camera 102 will be disclosed.

In step S02, the control unit 104 determines an exposure time and a gain used by the camera 102 when capturing a first image in a video sequence of images. The exposure time and the gain are examples of exposure settings of the camera 102. The exposure time and the gain may for example be received by the control unit 104 from the camera 102. Another exposure setting which also may be determined in step S02 is the size of the aperture, i.e. the iris, of the camera The exposure time and the gain are two parameters which are indicative of the illumination condition. This also applies to the size of the aperture. The exposure time governs how much light that enters into the camera sensor, and typically, during dark illumination conditions, a long exposure time is set in order to have enough light enter the camera sensor. Thus, a high exposure time is indicative of a dark illumination condition. Further, during a dark illumination condition the amount of light that enters the sensor is typically lower than during a light illumination condition. Therefore, the need for amplification of the sensed signal is larger during dark illumination conditions. Thus, a high value of the gain used for the amplification is also indicative of a dark illumination condition. In other words, the exposure time and the gain, and in particular the product thereof, may be used to get an indication of the current darkness level.

In step S04, the control unit 104, calculates a darkness level with respect to the first image in the video sequence based on at least the determined exposure time and gain. Preferably, the control unit 104 calculates the darkness level as a product of the exposure time and the gain. However, in some embodiments the control unit 104 may calculate the darkness level as a product of the exposure time, the gain, and the size of the aperture. In view of the above, the darkness level is thus a measure of the darkness in the scene.

Figure 2A:
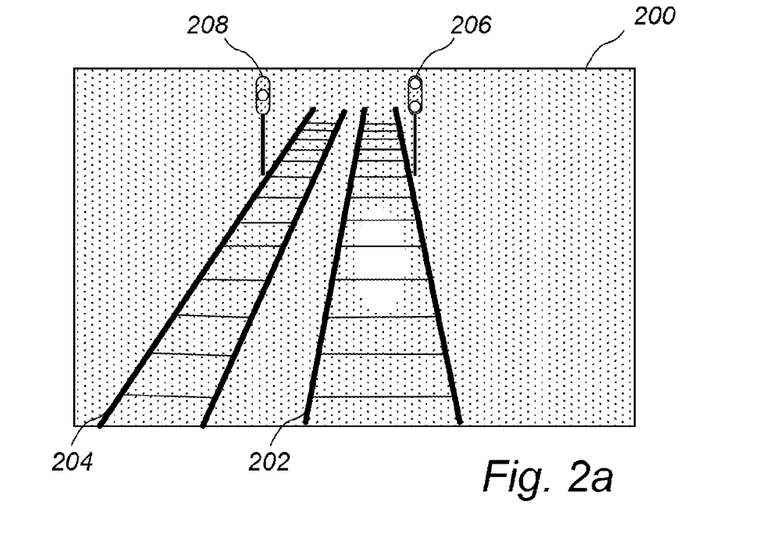
FIGS. 2a, 3a, 4a and 5a schematically illustrate images captured by the camera of FIG. 1.

FIG. 2a illustrates a first image 200 in a video sequence. In the illustrated example, the camera 102 is mounted to look ahead of a train running on a first track 202. There is also a second track 204 which runs in parallel with the first track 202. The train is approaching, but is still quite far away from, a first light signal 206 associated with the first track 202 and a second light signal 208 associated with the second track 204. In this example it is assumed that it is relatively dark outside such that the control unit 104 in step S04 calculates a relatively large darkness level for the first image 200.

Next in step S06, the control unit 104 calculates a saturation level with respect to the first image 200. The saturation level is calculated as a ratio between a number of saturated pixels and a number of completely dark pixels in the first image 200.

Figure 2B:
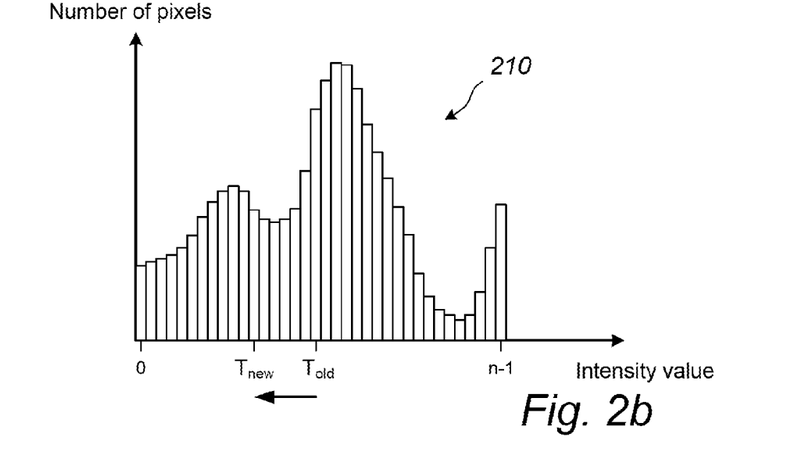
FIGS. 2b, 3b, 4b and 5b schematically illustrate intensity histograms of the images illustrated in FIGS. 2a, 3a, 4a, and 5a, respectively.

FIG. 2b illustrates a histogram 210 of intensity values of the pixels in the first image 200. In the histogram 210 the range of possible intensity values is divided into a plurality of bins, here illustrated by bins indexed by 0 . . . n−1. For example there may be 256 bins. The number of saturated pixels may typically correspond to the number of pixels in the bin indexed by n−1 at the upper end of the intensity range. Alternatively, the number of saturated pixels may correspond to the number of pixels in a few, such as two or three bins, at the upper end of the intensity range. For example, the number of saturated pixels may correspond to the number of pixels in the bins indexed by n−1 and n−2. The number of completely dark pixels may be calculated in a similar fashion as the number of pixels in the first bin indexed by 0 or as the number of pixels in the first few bins, such as in the two or three first bins in the histogram.

It is to be noted that the first image 200 may be a colour image, such as a red-green-blue (RGB) image. If so, the number of saturated pixels and the number of completely dark pixels may be deduced from a histogram of luminance (such as the Y component in a colour image having a YCbCr representation) or from raw pixel data in which all colours are represented.

In the illustrated example of FIG. 2b, there are quite a few pixels in the upmost bin indexed by n−1 in comparison to the lowest bin indexed by 0. In other words, the calculated saturation level will be quite high. In this case the saturation is caused by the presence of the first and second light signals 206, and 208 in an otherwise dark environment. Due to there being such a great contrast between the light signals 206, 208 and the surroundings, the light signals 206, 208 saturate in the image 200 as may be seen from the histogram in FIG. 2b. As a result of the saturation, the light signals 206, 208 appear as white in the image 200 and thus the colours of the light signals 206, 208 cannot be deduced from the image 200.

In step S08 the control unit 104 checks whether the saturation level exceeds a first limit or not. The first limit is a predefined parameter, which by way of example may take the value $10^{-3}$. The first limit may be subject to user input. On basis of the check, the control unit 104 then adjusts a target level for a mean intensity value of pixels in images captured by the camera 102.

In particular, if the control unit 104 has found that the saturation level exceeds the first limit, it proceeds to step S10 where the target value is decreased. In the illustrated example of FIG. 2a and FIG. 2b, it is assumed that the saturation level exceeds the first limit, and therefore the target value is decreased from its current value $T_{old}$ to a new value $T_{new}$.

Figure 7:
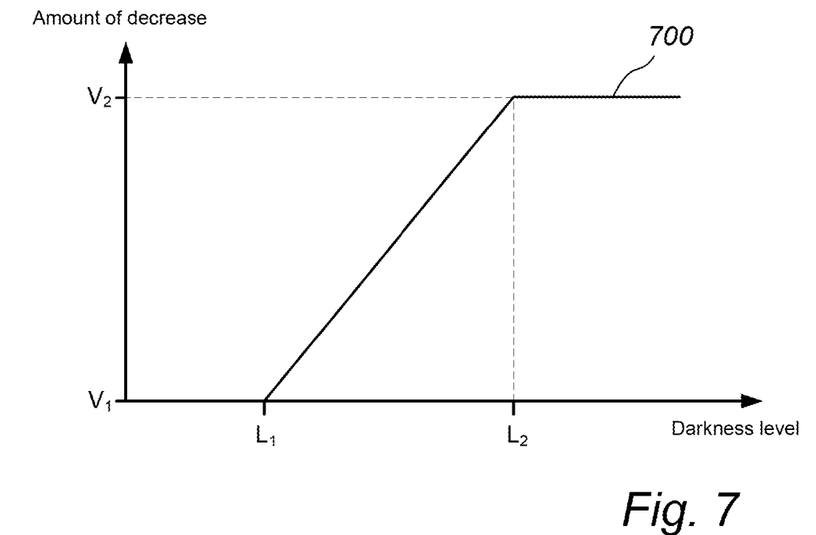
FIG. 7 schematically illustrates an increasing function according to which the target value for the mean intensity level may be decreased depending on the darkness level.

The amount of the adjustment, i.e. $T_{old}-T_{new}$, is determined according to a function which is an increasing function of the darkness level. An example of a function which may be used for this purpose is shown in FIG. 7. The illustrated function 700 takes a first value $V_1$ for darkness levels below a first threshold $L_1$ and takes a second value $V_2$ for darkness levels above a second threshold $L_2$. For darkness levels between $L_1$ and $L_2$ the function 700 increases smoothly, in this case linearly, from the first value $V_1$ to the second value $V_2$. The values $V_1$ and $V_2$ may for example be given in terms of a percentage with respect to the current target value. For example $V_1$ may correspond to 0% and $V_2$ may correspond to 50%. Thus, in some cases no decrease of the target value is made for darkness levels below the first threshold $L_1$. For darkness levels above the first threshold $L_1$ and below the second threshold $L_2$ the amount of the decrease of the target value increases linearly with darkness level. For darkness levels above the second threshold $L_2$ the amount of the decrease of the target level remains constant. At least the lower threshold value $L_1$, which may be interpreted as a threshold which distinguishes between a light illumination condition and a dark illumination condition, may be subject to user input.

In some embodiments, the second threshold $L_2$ may be set to be equal to the first threshold $L_1$, thus causing the function 700 to be a step function which takes the value $V_1$ for darkness levels below the first threshold $L_1$ and the value $V_2$ for darkness levels above or equal to the first threshold $L_1$.

Next the control unit 104, in step S14, controls the exposure, i.e. exposure settings such as the exposure time, the gain, and the aperture size of the camera 102. The control of the camera 102 influences images subsequent to the first image 200, such as the image 300 of FIG. 3a. The control of the exposure settings is made such that the mean intensity value of pixels in the subsequent images approaches the adjusted target value $T_{new}$. The control unit 104 typically bases the control on an error. According to one embodiment the error is calculated as the difference between the mean intensity value of pixels in the subsequent images and the adjusted target value $T_{new}$. According to another embodiment, the error is calculated as a ratio between the adjusted target value and the mean intensity value. As a result of the control, the intensity histogram for the subsequent images will be shifted such that its mean intensity value becomes equal or close to the adjusted target value $T_{new}$.

Figure 3A:
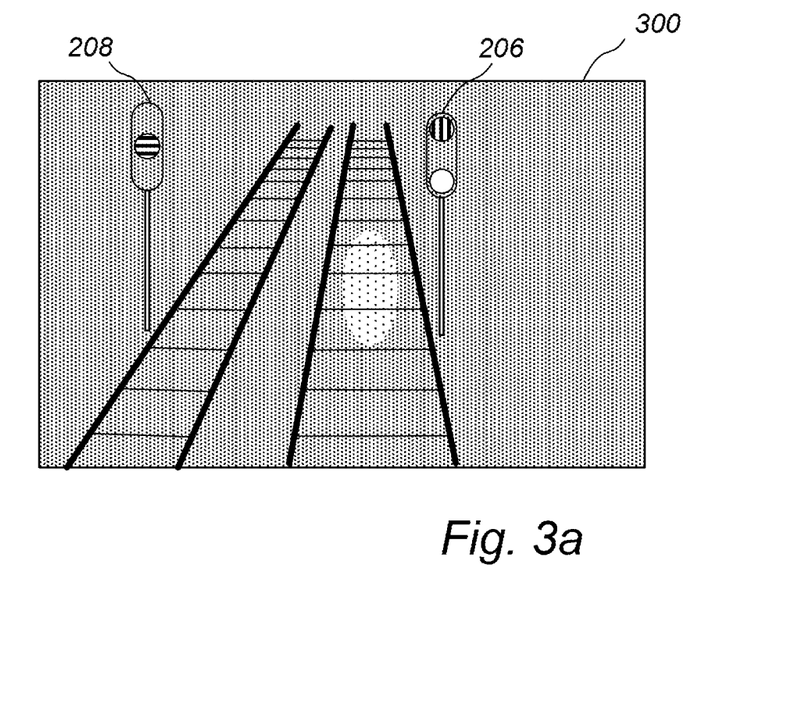
Figure 3B:
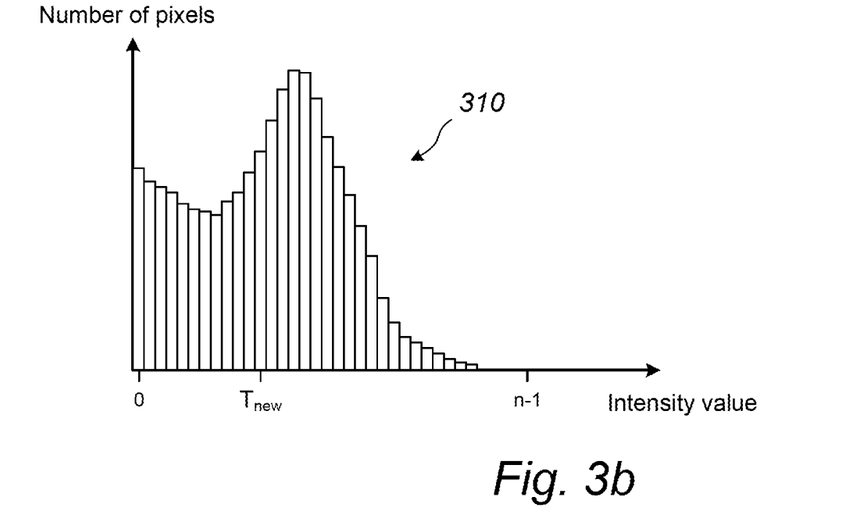
Figure 4A:
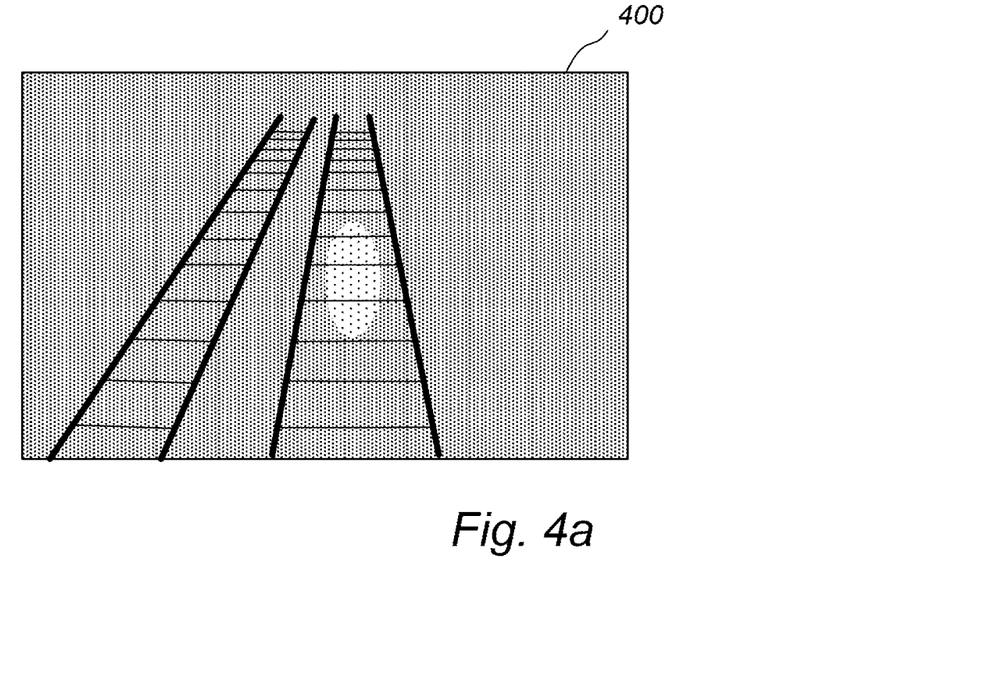
Figure 4B:
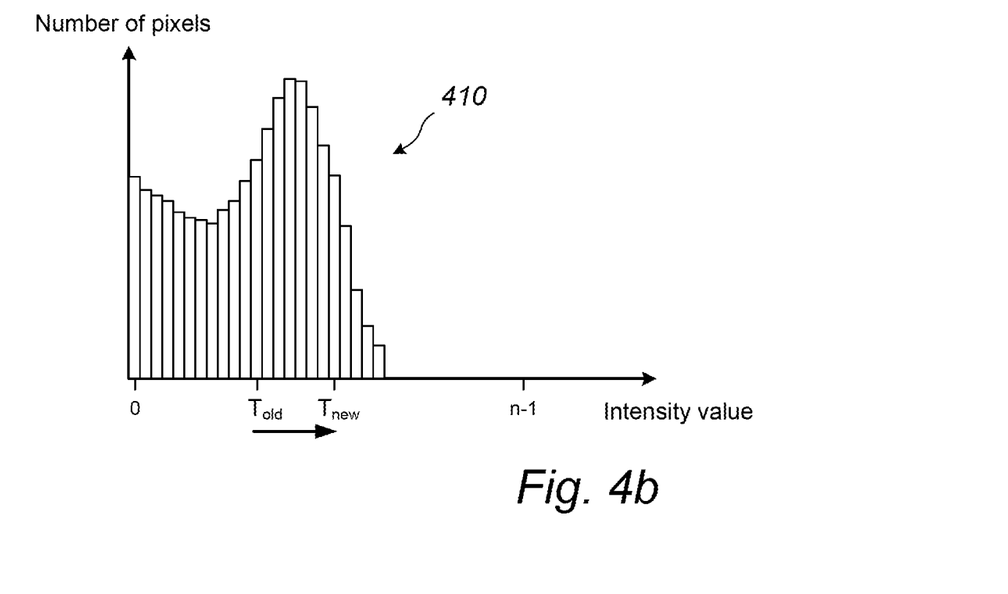

This is further illustrated in FIG. 3b which shows an intensity histogram 310 for the subsequent image 300 of FIG. 3a. Notably, the histogram 310 is shifted downwards on the intensity scale in comparison to the histogram 210 in FIG. 2a. Accordingly, the subsequent image 300 appears darker than the first image 200. However, more importantly, as a result of the downwards shift of the histogram 310 there are no longer any saturated pixels in the subsequent image 300. This has as an advantageous effect in that the colours of the light signals 208 and 206 may be seen in the subsequent image 300. For example, the subsequent image 300 may now reveal that the first light signal 206 comprises a green and a white light and that the second light signal 208 comprises a red light.

As discussed above, the control unit 204 may base the control on an error calculated from the mean intensity value and the adjusted target value $T_{new}$. In particular, the control unit 104 may generate a control signal based on the error.

According to one embodiment, in which the error is calculated as the difference between the mean intensity value of pixels in the subsequent images and the adjusted target value $T_{new}$, the control signal comprises a term which is proportional to the error (P-controller), and optionally a term which is proportional to the integral of the error (PI-controller), and optionally also a term which is proportional to the derivative of the error (PID-controller). The value of the control signal as a function of the error, in case such a control strategy is taken, is illustrated by the dashed curve 802 in FIG. 8.

According to another embodiment, the control signal is dependent on the error according to a function. The function typically takes the value zero for a value of the error corresponding to the mean intensity value being equal to the target value. In case the error is calculated as a difference between the mean intensity value and the target value, the value of the error corresponding to the mean intensity value being equal to the target value is thus the value zero. In case the error is calculated as a ratio between the target value and the mean intensity value, the value of the error corresponding to the mean intensity value being equal to the target value is thus the value one.

Further, the function has a derivative which increases with the distance between the error and the value that the error would take if the mean intensity value were equal to the target value.

Figure 8:
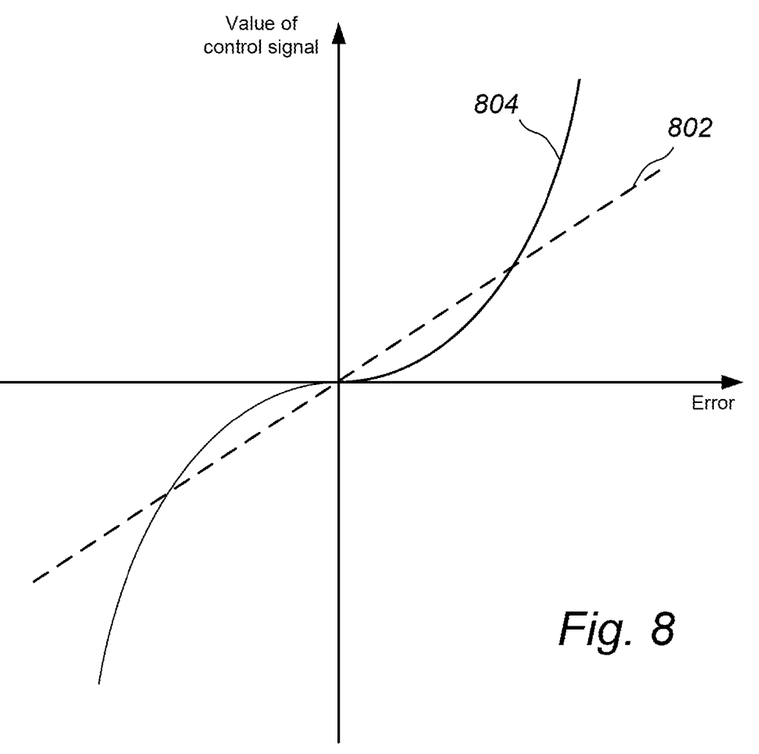
FIG. 8 schematically illustrates a function which maps an error in mean intensity value to a control signal value.

This control strategy is illustrated by the solid curve 804 in FIG. 8 in a case when the error is calculated as a difference between the mean intensity value and the target value. The function illustrated by the solid curve 804 may e.g. be in the form of an inverse sigmoid function. Other options are a power function (with odd power), such as a cubic function, or a function having an exponential growth for positive values of the error, and an exponential decline for negative values of the error. As further discussed above, this control strategy is advantageous in that a control is achieved which gives a fast convergence to the target value, at the same time as the mean intensity value smoothly approaches the target value when the error becomes small.

In a preferred embodiment, the error is calculated as a ratio between the target value and the mean intensity value. In such an embodiment the illustrated function 804 needs to be modified such that it takes the value zero when the error is equal to one. For example the illustrated function 804 may be shifted to the right by an appropriate amount.

It is to be understood that the disclosed method is iterative and is carried out in real-time, meaning that the above disclosed steps of the method are repeated such that the exposure of the camera 102 remains adapted to the current conditions with respect to illumination and saturation in images captured by the camera 102.

Returning to the example with the train-mounted camera 102, consider the situation when the train has passed the light signals 206 and 208. This is further illustrated in image 400 of FIG. 4a where no light signals are present in the scene. The image 400 appears dark since the target value was decreased in order to reduce saturation with respect to the light signals 206 and 208 which previously were included in the scene. This can also be seen from the corresponding intensity histogram 410 of FIG. 4a in which the pixel intensities are concentrated at the lower part of the available intensity range.

The control unit 104 repeats steps S02, S04, S06, and S08 as disclosed above with the image 400 as the "first image". In this case, the control unit 104 in step S08 notes that the saturation level does not exceed the first limit, for the reason that there are no saturated pixels in the image 400.

The control unit 104 may therefore proceed to step S12 in which it checks whether the saturation level is below a second limit which is (strictly) lower than the first limit. The second limit may similarly to the first limit be subject to user input. If the control unit 104 in step S12 finds that the saturation level is not below the second limit, no adjustment of the target value is performed. For the example image 400 of FIGS. 4a and 4b, the saturation level will however be below the second limit and the control unit 104 proceeds to step S14 in which the target value for the mean intensity value is increased. This is further illustrated in FIG. 4b, where the target value is increased from an old (the current) target value $T_{old}$ to a new target value $T_{new}$.

The amount of the increase, i.e. $T_{new}$-$T_{old}$, may be in the form of a predefined constant amount. The amount of the increase may also be set to be dependent on the darkness level, such that the amount decreases with the darkness level. In the latter case, a more conservative change in the target value may be applied when it is a dark illumination condition compared to when it is light illumination condition.

The control unit 104 then proceeds to step S16 and controls the exposure, i.e. exposure related parameters, of the camera 102 for subsequent images based on the adjusted target value $T_{new}$ in accordance with what has been disclosed above. In particular, the exposure of the camera 102, such as the exposure time and gain, are controlled such that the mean intensity value of the subsequent images approaches the adjusted target value.

This is illustrated in FIGS. 5a and 5b which show a subsequent image 500 and the corresponding intensity histogram 510, respectively. Compared to the intensity histogram 410 of FIG. 4b, the intensity histogram 510 is shifted towards higher intensity values. Still, since there are no strong lights, such as light signals in the scene, there is no problem with saturation. Accordingly, the image 500 appears as lighter in comparison to the image 400 of FIG. 4a and more details may be distinguished in the dark portions of the image 500.

It will be appreciated that a person skilled in the art can modify the above-described embodiments in many ways and still use the advantages of the invention as shown in the embodiments above. For example, in the above, the invention was described in connection to monitoring signal lights from a train. However, the disclosed method is applicable in any application in which it is important not to saturate any part of the image during night time, or otherwise dark conditions. This may for example include monitoring of license plates in darkness or looking inside of a window from outside when it is dark outside and light inside of the window. Thus, the invention should not be limited to the shown embodiments but should only be defined by the appended claims. Additionally, as the skilled person understands, the shown embodiments may be combined.

What is claimed is:

1. A method for controlling exposure of a camera, comprising:
    determining an exposure time and a gain used by the camera when capturing a first image in a video sequence;
    calculating a darkness level with respect to the first image as a product of at least the exposure time and the gain;
    calculating a saturation level with respect to the first image as a ratio between a number of saturated pixels and a number of completely dark pixels in the first image;
    if the saturation level exceeds a first limit, decreasing a target value for a mean intensity value of pixels in images captured by the camera by an amount which is an increasing function of the darkness level; and
    controlling exposure of the camera for images subsequent to the first image in the video sequence, such that the mean intensity value of pixels in the subsequent images approaches the decreased target value.

2. The method of claim 1, further comprising:
    if the saturation level is below a second limit which is lower than or equal to the first limit, increasing the target value for the mean intensity value of pixels in images captured by the camera; and
    controlling exposure of the camera for images subsequent to the first image in the video sequence, such that the mean intensity value of pixels in the subsequent images approaches the increased target value.

3. The method of claim 2, wherein, if the saturation level is below the second limit, the target value of the mean intensity value is increased by an amount which decreases with the darkness level.

4. The method of claim 1, wherein the increasing function of the darkness level takes the value zero for darkness levels below a first threshold, such that the target value is not decreased for darkness levels below the first threshold.

5. The method of claim 1, wherein the increasing function of the darkness level takes a first value for darkness levels below a first threshold and a second value for darkness levels above a second threshold larger than the first threshold, and wherein for darkness levels between the first threshold and the second threshold the function increases smoothly from the first value to the second value.

6. The method of claim 5, wherein the function increases linearly from the first value to the second value.

7. The method according to claim 4, further comprising receiving user input regarding the value of the first threshold.

8. The method according to claim 1, further comprising receiving user input regarding the value of the first limit and/or the second limit, if applicable, to which the saturation level is compared.

9. The method of claim 1, wherein a pixel in the first image is deemed to be a saturated pixel if the intensity value of the pixel exceeds a predefined value at an upper end of a range of possible intensity values, and wherein a pixel in the first image is deemed to be a completely dark pixel if the intensity value of the pixel is below a predefined value at a lower end of the range of possible intensity values.

10. The method of claim 1, further comprising generating a control signal for the camera based on an error calculated from the mean intensity value of pixels in the subsequent images and the decreased or, if applicable, the increased target value, the control signal being dependent on the error according to a function having a derivative which increases with a distance between the calculated error and a value that the error would take if the mean intensity value were equal to the decreased or, if applicable, the increased target value.

11. The method of claim 10, wherein the error is calculated as a ratio between the decreased or, if applicable, the increased target value and the mean intensity value of pixels in the subsequent images.

12. The method of claim 10, wherein the function having a derivative which increases is an inverse sigmoid function.

13. A control unit for controlling exposure of a camera, the control unit configured to:
    determine an exposure time and a gain used by the camera when capturing a first image in a video sequence;
    calculate a darkness level with respect to the first image as a product of at least the exposure time and the gain;
    calculate a saturation level with respect to the first image as a ratio between a number of saturated pixels and a number of completely dark pixels in the first image;
    if the saturation level exceeds a first limit, decrease a target value of a mean intensity value of pixels in images captured by the camera by an amount which is an increasing function of the darkness level; and control exposure of the camera for images subsequent to the first image in the video sequence such that the mean intensity value of pixels in the subsequent images approaches the decreased target value.

14. A surveillance system comprising at least one camera and a control unit according to claim 13 for controlling exposure of the at least one camera.

15. A non-transitory computer-readable medium comprising computer code instructions which when executed by a device having processing capability are adapted to perform the method according to claim 1.

* * * * *